(12) United States Patent
Razakarivony et al.

(10) Patent No.: US 12,097,977 B2
(45) Date of Patent: Sep. 24, 2024

(54) SYSTEM FOR MONITORING THE HEALTH OF A HELICOPTER

(71) Applicants: SAFRAN, Paris (FR); SAFRAN HELICOPTER ENGINES, Bordes (FR)

(72) Inventors: Sébastien Philippe Razakarivony, Moissy Cramayel (FR); Christophe Favre, Moissy Cramayel (FR); Julien Joseph, Moissy Cramayel (FR); Jean Lamouroux, Moissy Cramayel (FR)

(73) Assignees: SAFRAN, Paris (FR); SAFRAN SAFRAN HELICOPTER ENGINES, Bordes (FR)

( * ) Notice: Subject to any disclaimer, the term of this patent is extended or adjusted under 35 U.S.C. 154(b) by 417 days.

(21) Appl. No.: 17/603,227

(22) PCT Filed: Apr. 17, 2020

(86) PCT No.: PCT/FR2020/000135
§ 371 (c)(1),
(2) Date: Oct. 12, 2021

(87) PCT Pub. No.: WO2020/212665
PCT Pub. Date: Oct. 22, 2020

(65) Prior Publication Data
US 2022/0185503 A1 Jun. 16, 2022

(30) Foreign Application Priority Data
Apr. 18, 2019 (FR) ..................... 1904149

(51) Int. Cl.
*B64F 5/60* (2017.01)
*B64D 43/00* (2006.01)
(Continued)

(52) U.S. Cl.
CPC ............. *B64F 5/60* (2017.01); *B64D 43/00* (2013.01); *B64D 45/00* (2013.01); *F02C 9/18* (2013.01);
(Continued)

(58) Field of Classification Search
CPC .. B64D 45/00; B64D 2045/0085; B64D 29/00; B64D 31/06; B64D 43/00;
(Continued)

(56) References Cited

U.S. PATENT DOCUMENTS
7,062,370 B2 6/2006 Vhora et al.

FOREIGN PATENT DOCUMENTS
EP    1 103 926 A2    5/2001
FR    3 003 032 A1    9/2014
WO    WO-2014135809 A1 *  9/2014   ............ B64F 5/0045

OTHER PUBLICATIONS
International Search Report as issued in International Patent Application No. PCT/FR2020/000135, dated Sep. 17, 2020.

* cited by examiner

*Primary Examiner* — Maceeh Anwari
*Assistant Examiner* — Aarron E Santos
(74) *Attorney, Agent, or Firm* — Pillsbury Winthrop Shaw Pittman LLP

(57) ABSTRACT

A system monitors the health of a helicopter, and includes a device for determining a change of state of the engine and is configured to collect data measured by engine and external conditions sensors during a stable flight phase and to process the measured data.

12 Claims, 2 Drawing Sheets

(51) Int. Cl.
*B64D 45/00* (2006.01)
*F02C 9/18* (2006.01)
*F02C 9/28* (2006.01)

(52) U.S. Cl.
CPC ........ *F02C 9/28* (2013.01); *B64D 2045/0085* (2013.01); *F05D 2260/80* (2013.01); *F05D 2270/303* (2013.01); *F05D 2270/304* (2013.01)

(58) Field of Classification Search
CPC .... B64D 29/06; B64D 31/00; B64D 2221/00; B64D 2045/001; B64D 29/08; B64D 27/026; B64D 31/04; B64D 41/00; B64D 2027/005; B64D 33/00; B64D 35/08; B64D 13/08; B64D 27/00; B64D 27/14; B64D 27/24; B64D 31/14; B64D 37/26; B64D 15/22; B64D 2033/0233; B64D 27/40; B64D 37/20; B64D 47/00; B64D 47/08; B64D 13/00; B64D 15/04; B64D 15/20; B64D 2045/0065; B64D 2045/0075; B64D 27/10; B64D 31/12; B64D 33/02; B64D 37/02; B64D 37/32; B64D 37/34; B64D 45/0031; B64D 45/0051; B64D 45/0053; B64D 45/0056; B64D 45/0059; B64F 5/60; B64F 5/40; B64F 1/00; B64F 1/36; B64F 5/00; B64F 5/30; F05D 2260/80; F05D 2220/323; F05D 2220/32; F05D 2270/44; F05D 2270/303; F05D 2270/80; F05D 2270/11; F05D 2260/85; F05D 2270/54; F05D 2230/72; F05D 2270/301; F05D 2260/821; F05D 2270/304; F05D 2270/334; F05D 2260/82; F05D 2220/329; F05D 2270/3032; F05D 2270/309; F05D 2260/601; F05D 2260/81; F05D 2270/821; F05D 2260/83; F05D 2270/101; F05D 2270/332; F05D 2220/30; F05D 2220/80; F05D 2240/35; F05D 2270/3061; F05D 2270/709; F05D 2240/60; F05D 2270/64; F05D 2270/021; F05D 2270/051; F05D 2270/112; F05D 2270/31; F05D 2220/76; F05D 2260/96; F05D 2270/083; F05D 2270/09; F05D 2240/50; F05D 2260/20; F05D 2270/02; F05D 2270/335; F05D 2260/40311; F05D 2270/114; F05D 2270/702; F05D 2220/36; F05D 2260/40; F05D 2260/608; F05D 2270/10; F05D 2270/20; F05D 2270/71; F05D 2220/50; F05D 2260/403; F05D 2260/95; F05D 2260/98; F05D 2270/14; F05D 2270/804; F05D 2240/61; F05D 2260/407; F05D 2260/602; F05D 2270/071; F05D 2270/093; F05D 2270/094; F05D 2270/331; F05D 2270/809; F05D 2300/30; F05D 2300/40; F05D 2300/437; F05D 2300/507; F05D 2300/603; F05D 2300/6033; F05D 2220/70; F05D 2240/24; F05D 2240/55; F05D 2260/31; F05D 2270/04; F05D 2270/08; F05D 2270/092; F05D 2270/13; F05D 2270/311; F05D 2270/46; F05D 2270/8041; F05D 2200/30; F05D 2220/3217; F05D 2220/34; F05D 2220/40; F05D 2220/764; F05D 2220/766; F05D 2220/768; F05D 2230/30; F05D 2250/50; F05D 2260/4031; F05D 2260/60; F05D 2260/84; F05D 2270/082; F05D 2270/0831; F05D 2270/096; F05D 2270/122; F05D 2270/3011; F05D 2270/312; F05D 2270/313; F05D 2270/705; F05D 2270/803; F05D 2270/805; F05D 2300/611; F02C 9/00; F02C 9/28; F02C 3/04; F02C 7/00; F02C 7/26; F02C 7/18; F02C 9/26; F02C 7/36; F02C 7/266; F02C 7/275; F02C 9/22; F02C 7/057; F02C 7/222; F02C 7/268; F02C 7/28; F02C 9/18; F02C 9/40; F02C 3/20; F02C 9/44; F02C 7/32; F02C 9/42; F02C 7/232; F02C 7/262; F02C 9/20; F02C 9/46; F02C 6/20; F02C 9/263; F02C 3/10; F02C 3/14; F02C 3/16; F02C 7/06; F02C 7/22; F02C 7/228; F02C 7/24; F02C 7/264; F02C 7/27; F02C 6/08; F02C 6/12; F02C 7/20; F02C 9/36; F02C 7/045; F02C 7/12; F02C 7/185; F02C 7/047; F02C 9/48; F02C 3/113; F02C 6/14; F02C 6/18; F02C 7/05; F02C 7/277; F02C 7/30; F02C 9/16; F02C 9/266; F02C 9/30; F02C 9/32; F02C 9/58
See application file for complete search history.

SYSTEM FOR MONITORING THE HEALTH OF A HELICOPTER

CROSS-REFERENCE TO RELATED APPLICATIONS

This application is the U.S. National Stage of PCT/FR2020/000135, filed Apr. 17, 2020, which in turn claims priority to French patent application number 1904149 filed Apr. 18, 2019. The content of these applications are incorporated herein by reference in their entirety.

TECHNICAL FIELD OF THE INVENTION

The present invention relates to a system for monitoring the health of a helicopter notably making it possible to detect a change of state of the engine of the helicopter. The invention also relates to the method implemented by this system.

The invention finds applications in the field of the ground maintenance of aircraft and, in particular, helicopters.

TECHNOLOGICAL BACKGROUND OF THE INVENTION

It is known, in the field of the ground maintenance of helicopters, to carry out a control of the health of the engine of the helicopter (that is to say the working state of the engine) in order to determine notably when a servicing is necessary. Generally, the method for controlling the health of the engine consists in comparing the inputs and outputs of the engine compared to a reference model, at iso external conditions. The reference model may be a physical model based on the laws of physics, a model by learning constructed from real data, or a model relying on a combination of a physical model and a model by learning.

Thus, for each flight made, it is known to calculate an average discrepancy between the real temperature of the engine and the temperature estimated by the chosen reference model. The discrepancy is calculated during a stable flight phase, that is to say when the engine has reached a cruising speed (or nominal speed) during which the variables vary little, such that it is theoretically the same during the entire flight phase. The temporal evolution of this average discrepancy, between each flight, is monitored.

Such a method requires knowing the inputs and outputs of the engine, as well as the external conditions (external temperature, external pressure, etc.) which, in most cases, are known and measured by means of sensors. The reference model has the function of normalising the variables with respect to the external conditions. In theory, a discrepancy in the temperature of the engine is due to a change of state of the engine. Indeed, the engine being a thermodynamic system, this discrepancy cannot be due to chance and it is known that a change in engine temperature is caused either by a change of state of the engine, or by other variables. Thus, when the impact of the other variables has been neutralised thanks to the reference model, only the engine state remains to explain this change.

However, depending on the engine, certain actions required by the pilot and called "pilot actions" may arise suddenly such as, for example, an air bleed commanded by the pilot so that the engine supplies different systems (air conditioning, heating, etc.). These pilot actions are not always recorded and thus not taken into account in the neutralisation of variables even though they generate a considerable offset in the behaviour of the engine at iso conditions. This offset is then interpreted—wrongly—as a change of state of the engine.

The document FR 3 003 032 proposes a method making it possible to normalise the flight data of an aircraft from input data. The flight data are analysed by comparison between an average value and a digital model. This method does not however make it possible to detect non-recorded pilot actions automatically.

Thus, in the method of the document FR 3 003 032 as in most known methods for monitoring the health of an engine, pilot actions are interpreted as changes of state of the engine, which has the effect of generating false alerts and sending the helicopter for servicing whereas the engine does not have, in reality, any fault requiring servicing.

SUMMARY OF THE INVENTION

In order to respond to the aforementioned problem of false alerts of change of state of the engine, the applicant proposes a system for monitoring the health of a helicopter wherein non-recorded pilot actions are detected and differentiated from changes of state of the engine.

According to a first aspect, the invention relates to a system for monitoring the health of a helicopter, comprising:
  a helicopter comprising at least one engine, at least one engine sensor measuring a variable of the engine, at least one external conditions sensor measuring variables outside of the engine, and a device for memorising the data measured by the sensors, and
  a device for determining a change of state of the engine configured to collect, from the memorisation device, the data measured by the engine and external conditions sensors during at least one stable flight phase of a first flight, and to implement the following operations:
    a) comparison of said measured data with a reference model of the engine,
    b) determination, at each time step of the stable flight phase, of an instant offset between each measured datum and each datum estimated by the reference model of the engine,
    c) determination, over the whole of the stable flight phase, of an overall offset between the measured data and the data estimated by the reference model of the engine,
    d) determination, at each time step of the stable flight phase, of an intrinsic residual corresponding to a difference between the instant offset and the overall offset,
    e) determination of one or more deviant portion(s) corresponding to the part(s) of the intrinsic residual not meeting a predetermined criterion, each deviant portion containing information relating to a non-recorded pilot action, and
    f) determination of a corrected residual corresponding to the instant offset from which the deviant portion has been removed.
the corrected residual being analysed to determine if the state of the engine has changed.

This system has the advantage of using the entire temporal series of residuals between the reference model and the real data, which makes it possible to be free of the influences of external conditions and to decouple the moments where a non-recorded pilot action occurs from moments where a change of state of the engine occurs.

Advantageously, the analysis of the corrected residual comprises a collection, by the device for determining a change of state of the engine, of data measured during a stable flight phase of at least one second flight and a comparison of the corrected residual relating to the first flight with the corrected residual relating to the second flight.

Apart from the aforementioned characteristics, the system according to the invention may have one or more complementary characteristics among the following, considered individually or according to all technically possible combinations thereof:
- the data measured by the engine sensor are real values of the temperature inside the engine and the data measured by the external conditions sensor are real values of the temperature outside the engine;
- the helicopter comprises at least one piloting data sensor able to measure the torque or the speed of rotation of the engine connected to the memorisation device;
- the data estimated by model are a temperature inside the engine;
- the data estimated by model are a torque or a speed of rotation of the engine;
- the device for determining a change of state of the engine implements an operation of confirmation of a stable flight phase by analysis of the torque or the speed of rotation of the engine;
- the intrinsic residual is de-noised before being compared with at least one predetermined criterion;
- the predetermined criterion with which the intrinsic residual is compared is a temperature threshold;
- the data are measured by the engine and external conditions sensors during several stable flight phases, steps a) to f) being implemented over the whole of the stable flight periods;
- the pilot action is an air bleed.

According to a second aspect, the invention relates to a method for monitoring the health of a helicopter. This method is characterised by the fact that it is implemented by the monitoring system defined above.

BRIEF DESCRIPTION OF THE FIGURES

Other advantages and characteristics of the invention will become clear on reading the description, illustrated by the figures in which.

DETAILED DESCRIPTION

An exemplary embodiment of a system for monitoring the health of a helicopter is described in detail hereafter, with reference to the appended drawings. This example illustrates the characteristics and advantages of the invention. It is however recalled that the invention is not limited to this example.

In the figures, identical elements are marked by identical references. For reasons of legibility of the figures, the size scales between represented elements are not respected.

Figure 1:
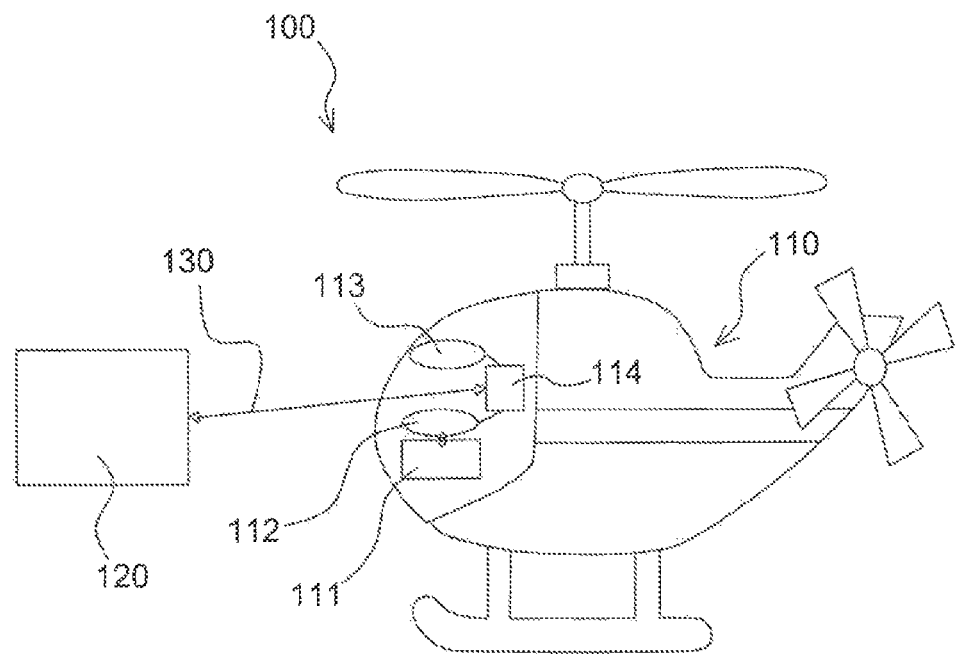
FIG. 1 represents a schematic example of a system for monitoring the health of a helicopter according to the invention.

FIG. 1 schematically represents an exemplary system for monitoring the health of a helicopter. This system 100 comprises a helicopter 110 and a device 120 for determining a change of state of the engine, hereafter simply called determination device. The helicopter 110 is notably equipped with an engine 111 and sensors 112-113. The helicopter comprises, in particular, at least one engine sensor 112 mounted as near as possible to the engine and suitable for measuring the temperature inside the engine. The helicopter further comprises at least one external conditions sensor 113, for example positioned on one side of the helicopter, and suitable for measuring variables outside the engine such as the external temperature. In an embodiment, the helicopter 110 further comprises a sensor 115 (represented in FIG. 3) for measuring piloting data such as, for example, the torque or the speed of rotation of the engine, the type of sensor (torque or speed of rotation) being determined as a function of the type of helicopter. Other sensors may obviously be installed on board the helicopter, to measure other variables or parameters relating to the flight conditions, such as for example sensors for external pressure, moisture level, speed, acceleration, altitude, etc., and/or to the engine, such as for example sensors for internal pressure, vibrations, etc.

The helicopter also comprises a device 114 for memorising data measured by the sensors 112-113. This memorisation device 114 is connected, by wire connections or wireless connections, to each of the sensors and memorises the different data measured by these sensors during at least one part of the stable flight phase (or during the entire stable flight phase, or even the entire duration of the flight).

"Stable flight phase" designates a flight phase during which the flight conditions are substantially stable. The flight conditions are considered as substantially stable when the flight parameters do not vary or vary little, for example when they vary in a range of values of a percentage or a predetermined amplitude.

The device 120 for determining a change of state of the engine 111 of the helicopter 110 is suitable for collecting the data measured by the sensors 112, 113 and/or 115 in the course of a predefined period and, in particular, in the course of the stable flight phase. It is configured to be connected to the memorisation device 114 of the helicopter by a connection, referenced 130 in FIG. 1, which may be a wire connection or a wireless connection of, for example, Wifi or Bluetooth type.

The determination device 120 may be, for example: a calculation unit or a computer configured to implement the steps of the method (described below) using the data measured by the sensors implemented in the helicopter. The determination device 120 may be on board the helicopter; it may also be installed on the ground, for example in the premises of the maintenance unit, in order not to generate additional weight in the helicopter.

The determination device 120 hosts a reference model of the engine 111. This reference model is a digital model that represents the normal behaviour of the engine, that is to say the behaviour of an engine in good health during at least one stable flight phase. A reference model is constructed for each engine notably from flight parameters, of which the torque or the speed of rotation, measured and recorded by the memorisation device. This may be a so-called "physical" model constructed following the laws of physics, or a so-called model "by learning" constructed by analysis of a plurality of real data, or a model constructed by combination of a physical model and a model by learning.

The reference model links variables of the engine and variables outside of the engine to determine the expected behaviour of the engine when said engine is in good health. It represents, in particular, the internal temperature expected for the engine, this internal temperature being a normalised temperature, indicative of the state of the engine and commonly designated T45, TC, TGT, etc., according to the manufacturers.

Figure 3:
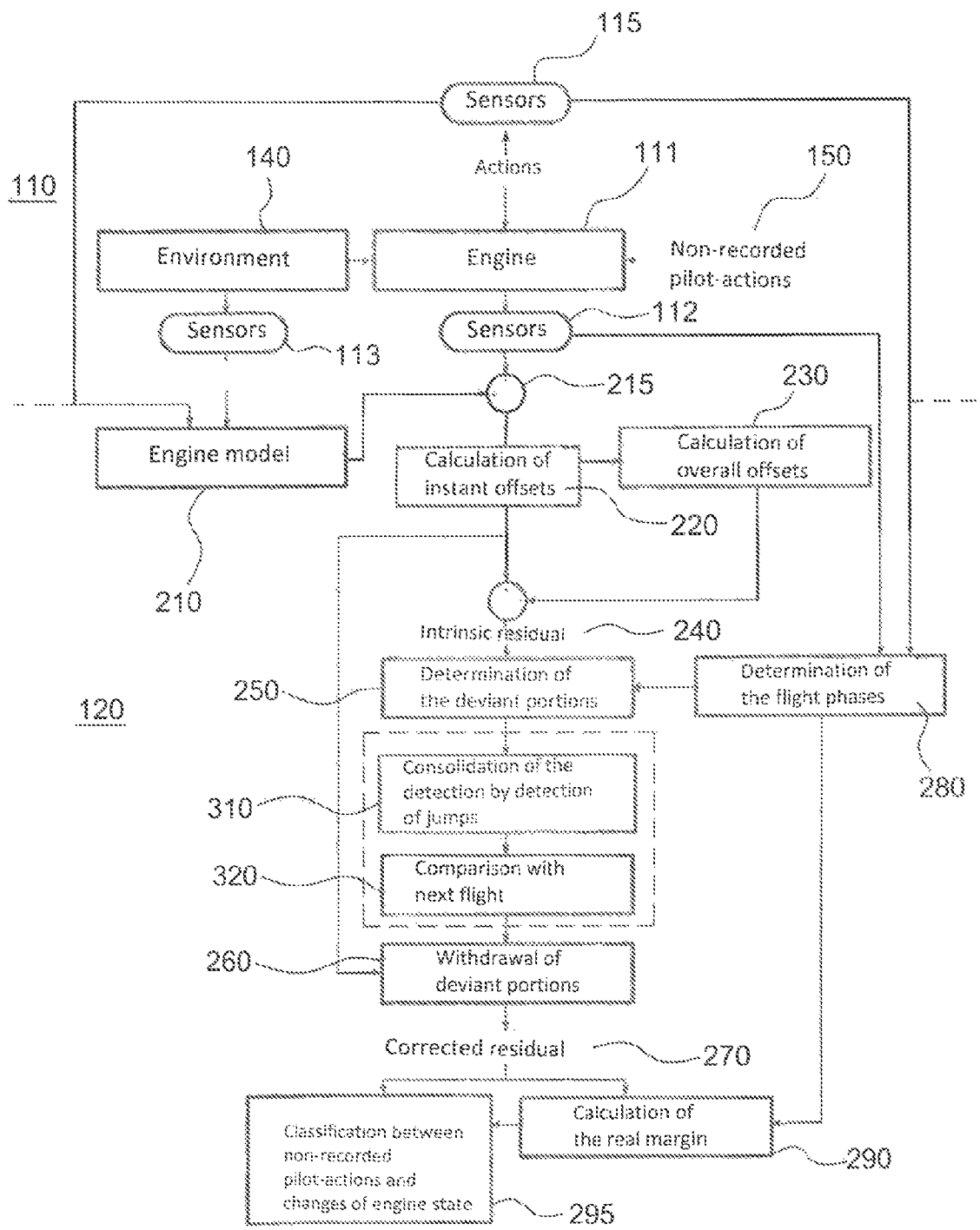
FIG. 3 represents an example of functional diagram of the operations implemented by the system of FIG. 1.

The determination device 120 of the system of the invention implements a succession of operations that are going to be described in relation with FIG. 3. Firstly, the determination device 120 collects the data measured by the sensors inside the engine and the sensors outside the engine and, in particular, by the sensors 112, 113 and 115. In the example of FIG. 3, the determination device 120 records data relating to the temperature of the engine 111, measured, at a predefined time step, by the engine sensor 112. It also records data relating to the environment 140 such as, for example, the temperature outside the engine measured by the sensor 113. It further records piloting data such as, for example, the torque or the speed of rotation of the engine measured by the sensor 115.

Whether they relate to the environment, to the engine or to the piloting, the data measured by the sensors 112, 113, 115 may have effects on the behaviour of the engine. Similarly, pilot actions 150, non-measured and non-recorded, such as for example an air bleed, may have effects on the behaviour of the engine. The system of the invention makes it possible, by comparison of these different measurements with the reference model of the engine and by analysis of this comparison, to detect non-recorded pilot actions in order to be able to differentiate them from changes of state of the engine. A typical pilot action is an air bleed.

To do so, the determination device 120 ensures, at step 215, a comparison of the data measured by the engine sensor 112 with the reference model of the engine, referenced 210. From this comparison, it determines, at step 220, an instant offset between each datum measured by the sensor engine 112 and each datum estimated by the reference model 210. An instant offset is calculated for a predefined time step which may be, for example, several seconds (typically ten or so seconds). Thus, at each time step, a so-called instant offset between the real value measured by the sensor 112 and the value estimated by the reference model 210 is determined. A plurality of instant offsets are thus regularly calculated during a known time interval, for example, over the duration of a stable flight phase.

The determination device 120 determines, further, at step 230, an overall offset between the data measured by the sensor engine 112 and the data estimated by the reference model 210. This overall offset is calculated from all or part of the instant offsets determined above.

The instant offset is calculated for each time step, by difference between the real internal temperature of the engine (measured by the engine sensor 112) and the estimated internal temperature of the engine (determined by the reference model).

The overall offset, or general offset, is calculated over a predefined period such as, for example, a part or the totality of the stable flight phase. The overall offset may be calculated, for example, by average, by mode or by minimisation. In the example of FIG. 3, the overall offset is the average, over the predefined period, of the instant offsets calculated during this period.

The determination device 120 next carries out a comparison between the instant offset and the overall offset to determine an intrinsic residual 240. This intrinsic residual 240 is the difference, at each time step, between the instant offset and the overall offset. This intrinsic residual 240 is a significant datum of the alignment between the simulation and reality. It is this intrinsic residual that is next going to be processed and analysed over the predefined period, to make it possible to determine the evolution of the state of the engine.

The determination device 120 next carries out an operation 250 of determination of the deviant portions of the intrinsic residuals. These deviant portions are obtained by comparing the intrinsic residuals with at least one predetermined criterion, the part of the intrinsic residuals not corresponding to the predetermined criterion constituting a deviant portion. The predetermined criterion may be a predefined value, a set of predefined values, one or more aeronautical rules, etc. It may be chosen as a function of the engine and the helicopter. The predetermined criterion may, for example, be a threshold value defined as a function of preceding flights. In the example of FIG. 3, the predetermined criterion is a temperature threshold, an example of which will be described in relation with FIG. 2. Obviously, each intrinsic residual 240, calculated for each time step, does not generate a deviant portion. The deviant portion, when it exists, corresponds to the part of the signal containing information relating to a non-recorded pilot action.

At step 260, the deviant portion determined at step 250 is removed from the corresponding instant offset, so as to generate a corrected residual 270. In other words, step 260 consists in recalculating a residual without deviant portion, which is called corrected residual. This corrected residual 270 may next be analysed in order to determine if it is the result of a pilot action having an incidence on the engine or if it is the result of a change of state of the engine.

As explained previously, this analysis of the corrected residual is carried out for the residuals detected during a stable flight phase. To do so, the determination device 120 verifies, at step 280, that the processed data are indeed data measured during a stable flight phase. This verification is carried out by analysing the data measured by the engine sensor 112 and the piloting data sensors 115. If it is confirmed that the corrected residual 270 has indeed been calculated for a stable flight period, then the determination device 120 determines, at step 290, a so-called "real" margin from the corrected residual. A classification operation 295, for example by means of an automatic classification algorithm, makes it possible to record changes of state of the engine liable to require a servicing of the engine. This classification operation 295 may intervene after the generation of the corrected residual (step 270) or instead before the operation 260 of removal of the deviant portions.

Figure 2:
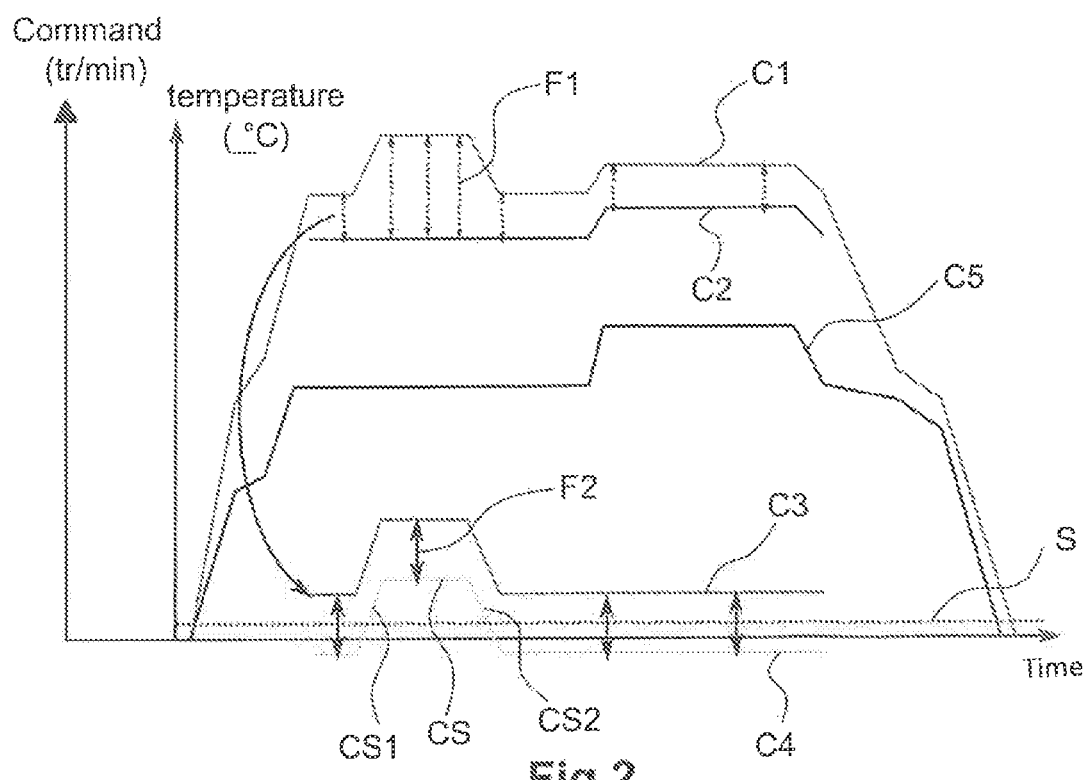
FIG. 2 schematically represents, in the form of curves, examples of values and data measured and calculated by the system for monitoring the health of a helicopter according to the invention.

The method that has been described may be illustrated by means of curves such as those represented in FIG. 2. Indeed, as will be understood from the preceding, the determination device 120 processes the data as a temporal series: the data, and notably the residuals, may thus be represented in the form of curves. The curves C1 to C4 represent the temperature as a function of time for different signals measured or calculated by the determination device 120. The curve C5 represents the signal relating to a recorded command, as a function of time. More precisely, the curve C1 represents an example of real temperature measured by the engine sensor 112. The curve C2 represents the temperature estimated with the reference model from the recorded command of the curve C5. The arrows F1 represent the instant offsets calculated at step 220 of the method. The arrows F2 represent the overall offset calculated at step 230 of the method. The intrinsic residual 240 obtained by difference between the instant offsets and the overall offset is represented by the curve C3. This curve C3 is thus representative of the difference between the real temperature and the estimated temperature of the engine. The curve C4 represents the corrected residual 270. This corrected residual 270 comprises a portion CS of which the temperature value is greater than a predefined temperature threshold S (the temperature threshold S is the predetermined criterion of the method). This portion CS corresponds to a non-recorded pilot action. It will be understood, by analysis, that this portion CS cannot be the result of an engine change because it comprises a rising edge CS1 and a falling edge CS2. Yet, when a jump in the signal (for example a rising edge) is the consequence of a change of state of the engine, there cannot be an opposite jump (falling edge) allowing the signal to return to its preceding state because a fault of the engine is never repaired by itself. Consequently, the portion CS is necessarily due to a non-recorded pilot action.

The method implemented by the determination device 120 may further comprise optional operations. An operation 310 of consolidation of the deviant portions obtained at step 250 may be implemented by detection of jumps (rising and/or falling edges) in the signal relating to the deviant portions. As explained in relation with FIG. 2, this operation 310 makes it possible, by analysis of jumps, to determine if the corrected residual is generated by a change of state of the engine or a non-recorded pilot action.

A consolidation operation 320 may also be implemented, in addition to or instead of the consolidation operation 310, to confirm the detection of a change of state of the engine. This consolidation operation 320 consists in comparing the results obtained during a first flight with the results obtain during at least one second flight. In particular, the deviant portion calculated during a first flight is compared with the corrected residual calculated during a second flight or a following flight. If the values of the deviant portion of the first flight and the corrected residual of the second flight are similar, then the deviant portion corresponds to a change of state of the engine. If the values are different, the deviant portion is the result of a non-recorded pilot action. Indeed, a change of state of the engine is permanent whereas a non-recorded pilot action is one-off.

An additional consolidation operation (not represented in the figures) may also be added, notably when the torque and/or the speed of rotation of the engine are measured. This additional consolidation operation consists in comparing the fluctuations of the instant residual on other variables than temperature, such as the torque or the speed of rotation of the engine, in order to confirm if the deviant portion is a pilot action or a change of engine state. Indeed, in the case of a change of state of the engine, the instant residuals on the other variables will deviate simultaneously.

The method implemented by the determination device 120 may also comprise, after the operation for determining the intrinsic residual 240, an additional operation of de-noising said intrinsic residual. This de-noising operation may be implemented, for example, by smoothing by average or by median, with the aim of facilitating steps 310, 320, 260, and 290.

The method implemented by the determination device 120 has been described previously in the case where the engine parameter measured by the engine sensor 112 is the internal temperature of the engine. Obviously, other parameters may be taken into consideration instead of, or in addition to, the internal temperature of the engine, the method remaining identical whatever the parameter chosen. For example, data relating to the torque or to the speed of rotation of the engine may be processed instead of or in addition to the internal temperature of the engine.

Although described through a certain number of examples, alternatives and embodiments, the system for monitoring the health of a helicopter according to the invention comprises various alternatives, modifications and improvements that will become obvious to those skilled in the art, it being understood that these alternatives, modifications and improvements fall within the scope of the invention.

The invention claimed is:

1. A monitoring system for monitoring the health of a helicopter having at least one engine, said system comprising:
at least one engine sensor measuring an engine variable, at least one external conditions sensor measuring variables outside of the at least one engine, and a device for memorizing data measured by the at least one engine and the at least one external condition sensors, and
a device for determining a change of state of the at least one engine configured to collect, from the memorization device, the data measured by the at least one engine and the at least one external conditions sensors during at least one stable flight phase of a first flight the device for determining a state being a computer on board the helicopter or on the ground, implementing the following operations to detect unrecorded pilot actions and differentiate them from changes of state of the at least one engine:
a) comparison of said measured data with a reference model of the at least one engine, the reference model being a digital model hosted by the computer and representing a behavior of an engine in good health during at least one stable flight phase,
b) determination, at each time step of the stable flight phase, of an instant offset between each measured datum and each datum estimated by the reference model of the at least one engine,
c) determination, over the whole of the stable flight phase, of an overall offset between the measured data and the data estimated by the reference model of the at least one engine, the overall offset being calculated from a part at least of the instant offsets determined at step b),
d) determination, at each time step of the stable flight phase, of an intrinsic residual corresponding to a difference between the instant offset and the overall offset,
e) determination of one or more deviant portions corresponding to one or more parts of the intrinsic residual not meeting a predetermined criterion, each deviant portion, when it exists, containing information relating to a non-recorded pilot action, and
f) determination of a corrected residual corresponding to the instant offset from which the one or more deviant portions have been removed,
the corrected residual being analyzed by the computer in order to determine if it is the result of a pilot action having an incidence on the engine or if it is the result of a change of state of the at least one engine, such a change of state of the at least one engine requiring a servicing of the helicopter.

2. The monitoring system according to claim 1, wherein the analysis of the corrected residual comprises a collection, by the device for determining a change of state of the engine, of data measured during a stable flight phase of at least one second flight and a comparison of the deviant portion relating to the first flight with the corrected residual relating to the second flight.

3. The monitoring system according to claim 1, wherein the helicopter comprises at least one piloting data sensor adapted to measure a torque or a speed of rotation of the at least one engine connected to the memorization device.

4. The monitoring system according to claim 3, wherein the device for determining a change of state of the at least one engine implements an operation of confirmation of a stable flight phase by analysis of the torque or the speed of rotation of the engine measured by the piloting data sensor.

5. The monitoring system according to claim 1, wherein the data measured by the at least one engine sensor are real values of the temperature inside the at least one engine and the data measured by the at least one external conditions sensor are real values of the temperature outside the at least one engine.

6. The monitoring system according to claim 1, wherein the data estimated by model are a temperature inside the at least one engine.

7. The monitoring system according to claim 1, wherein the data estimated by model are a torque or a speed of rotation of the at least one engine.

8. The monitoring system according to claim 1, wherein the intrinsic residual is de-noised before being compared to at least one predetermined criterion.

9. The monitoring system according to claim 8, wherein the predetermined criterion with which the intrinsic residual is compared is a temperature threshold.

10. The monitoring system according to claim 1, wherein the data are measured by the at least one engine and at least one external conditions sensors during several stable flight phases, steps a) to f) being implemented over the whole of the stable flight periods.

11. The monitoring system according to claim 1, wherein the pilot action is an air bleed.

12. A method for monitoring the health of a helicopter, comprising implementing steps a) to f) by the monitoring system according to claim 1.

\* \* \* \* \*